United States Patent Office 3,293,311
Patented Dec. 20, 1966

3,293,311
PREPARATION OF 1-HALODECAHYDRO-
NAPHTHALENES
Edwin L. De Young, Chicago, and Ted Symon, Lombard, Ill., assignors to Universal Oil Products Company, Des Plaines, Ill., a corporation of Delaware
No Drawing. Filed Apr. 7, 1964, Ser. No. 358,094
14 Claims. (Cl. 260—648)

This invention relates to a process for obtaining 1-halodecahydronaphthalenes and particularly to a process for obtaining the 1-halodecahydronaphthalenes in a relatively pure state which is free from other halogenated decahydronaphthalenes in which the halo substituents are in a position other than the number 9 carbon atom.

The products resulting from the process of the present invention which comprise a pure isomer of a halodecahydronaphthalene, and particularly 1-halodecahydronaphthalenes, will find a wide variety of use in the chemical field. For example, the 1-halodecahydronaphthalenes may be used as intermediates in the preparation of alcohols or olefins, said compounds being useful as plasticizers for various resins or in the aroma industry as components of perfumes, colognes, scents for aftershave lotions, soaps, detergents, etc. In addition to the aforementioned uses, it is also contemplated that the halodecahydronaphthalenes may be used as intermediates in the preparation of insecticides, especially insecticides which are effective against house flies, or solvents. Heretofore, the prior art has taught that commercial mixtures of cis- and trans-decahydronaphthalene, when chlorinated with a halogenated hydrocarbon such as t-butyl chloride in the presence of aluminum chloride, will yield a mixture of both 1-chloro and 9-chlorodecahydronaphthalene.

We have now discovered that a pure isomer, and specifically a 1-halodecahydronaphthalene, can be obtained by treating pure trans-decahydronaphthalene with a polyhalogenated hydrocarbon in the presence of certain catalytic compositions of matter. The pure trans-decahydronaphthalene which is a necessary starting material for the process of this invention can be obtained from the hydrogenation of naphthalene or tetrahydronaphthalene in the presence of certain specific hydrogenation catalysts hereinafter set forth in greater detail.

It is therefore an object of this invention to provide a process for obtaining pure isomers of halogenated decahydronaphthalenes.

A further object of this invention is to provide a process for obtaining pure 1-halodecahydronaphthalenes.

In a broad aspect of this invention one embodiment resides in a process for the production of a 1-halodecahydronaphthalene which comprises treating trans-decahydronaphthalene with a polyhalogenated hydrocarbon in the presence of a free radical generating catalyst at a temperature at least as high as the decomposition temperature of said catalyst, and recovering the resultant 1-halodecahydronaphthalene.

A further embodiment of this invention is found in a process for the production of 1-chlorodecahydronaphthalene which comprises treating trans-decahydronaphthalene with a polychlorinated hydrocarbon in the presence of an organic peroxide catalyst at a temperature in the range of from about 50° to about 300° C., and recovering the resultant 1-chlorodecahydronaphthalene.

A specific embodiment of this invention is found in a process for the production of 1-chlorodecahydronaphthalene which comprises treating trans-decahydronaphthalene with carbon tetrachloride in the presence of benzoyl peroxide at a temperature in the range of from about 80° to about 120° C., and recovering the resultant 1-chlorodecahydronaphthalene.

Other objects and embodiments will be found in the following further detailed description of this invention.

As hereinbefore set forth, the process of the present invention is concerned with the obtention of a pure isomer of a halogenated decahydronaphthalene which, in the present instance, comprises 1-halodecahydronaphthalene. The starting material utilized in the process of this invention comprises pure trans-decahydronaphthalene. This trans-decahydronaphthalene can be obtained by treating pure cis-decahydronaphthalene, which was obtained from the hydrogenation of naphthalene or tetrahydronaphthalene, with aluminum chloride whereby the aforementioned cis-decahydronaphthalene is isomerized to trans-decahydronaphthalene. In addition, it is also contemplated within the scope of this invention that the pure trans-decahydronaphthalene can also be obtained from an efficient distillation of a commercially available cis- and trans-decahydronaphthalene mixture, the boiling point of the trans-decahydronaphthalene being approximately 8 degrees lower than that of the cis-decahydronaphthalene isomer, the difference in boiling points being sufficient to effect a fractional distillation in such a manner so as to recover the pure isomers.

The polyhalogenated hydrocarbons which are utilized in treating the pure trans-decahydronaphthalene preferably comprise hydrocarbons containing from 1 to about 6 carbon atoms or more in length and which contain at least 2 halide substituents. Specific examples of these compounds which may be used include trichloromethane (chloroform), tribromomethane (bromoform), triiodomethane (iodoform), trifluoromethane (fluoroform), carbon tetrachloride, carbon tetrabromide, carbon tetraiodide, carbon tetrafluoride, 1,1,1-trichloroethane, 1,1,1-tribromoethane, 1,1,1-triiodoethane, 1,1,1-trifluoroethane, 1,1,2,2 - tetrachloroethane, 1,1,2,2 - tetrabromoethane, 1,1,2,2-tetraiodoethane, 1,1,2,2-tetrafluoroethane, 1,1,3,3-tetrachloropropane, 1,1,3,3 - tetrabromopropane, 1,1,3,3-tetraiodopropane, 1,1,3,3-tetrafluoropropane, 1,1,1,3,3,3-hexachloropropane, 1,1,1,3,3,3-hexabromopropane, 1,1,1,3,3,3-hexaiodopropane, 1,1-dichlorobutane, 1,1-dibromobutane, 1,1 - diiodobutane, 1,1-difluorobutane, 1,1,1-trichlorobutane, 1,1,1-tribromobutane, 1,1,1-triiodobutane, 1,1,1 - trifluorobutane, 1,1,2 - trichlorobutane, 1,1,2 - tribromobutane, 1,1,2-triiodobutane, 1,1,2 - trifluorobutane, 1,1,4,4-tetrachlorobutane, 1,1,4,4-tetrabromobutane, 1,1,4,4 - tetraiodobutane, 1,1,4,4-tetrafluorobutane, 1,1,2,5,5-pentachloropentane, 1,1,2,5,5-pentabromopentane, 1,1,2,5,5 - pentaiodopentane, 1,1,2,5,5-pentafluoropentane, 1,1-dichlorohexane, 1,1-dibromohexane, 1,1 - diiodohexane, 1,1 - difluorohexane, 1,2 - dichlorohexane, 1,2-dibromohexane, 1,2 - diiodohexane, 1,2-difluorohexane, 1,1,6,6-tetrachlorohexane, 1,1,6,6 - tetrabromohexane, 1,1,6,6-tetraiodohexane, 1,1,6,6-tetrafluorohexane, etc. It is also contemplated within the scope of this invention that hydrocarbons containing more than one species of halide substituents may also be used although not necessarily with equivalent results. Examples of these compounds would include fluorodichloromethane, fluorodibromomethane, fluoro-1,1-dichloro-1,2-dibromomethane, fluoropentabromoethane, fluoropentachloroethane, fluorotribromoethane, fluorotrichloroethane, fluorochloromethane, chlorodibromomethane, chlorodibromethane, chlorodiiodomethane, iododdibromomethane, etc. Of the polyhalogenated hydrocarbons the hydrocarbons which contain at least 2 chloro- or bromo-substituents are preferred due to the relatively greater availability of these compounds. It is to be understood that the aforementioned polyhalogenated hydrocarbons are only representatives of the class of compounds which may be used and that the present invention is not necessarily limited thereto.

These catalysts which may be used in the present process are those which are capable of forming free radicals under the reaction conditions. These include peroxy compounds, containing the bivalent radical —O—O—, and which are capable of inducing the transfer of the halogen from the halogenated compound to the naphthenic ring. The organic peroxy compounds constitute a preferred class of catalyst for use in this invention and include peracetic acid, persuccinic acid, dimethyl peroxide, diethyl peroxide, dipropyl peroxide, di-t-butyl peroxide, butyryl peroxide, lauroyl peroxide, benzoyl peroxide, tetrahydronaphthalene peroxide, urea peroxide, t-butyl perbenzoate, t-butyl hydroperoxide, methylcyclohexyl hydroperoxide, cyclohexanone peroxide, cumene hydroperoxide, etc. Thus, organic peroxy compounds which are compounded commercially with various diluents for use as free radical generating catalysts may be used and include benzoyl peroxide compounded with calcium sulfate, benzoyl peroxide compounded with camphor, etc. Only catalytic amounts (less than stoichiometric amounts) are needed.

The reaction of the present process involving the aforementioned starting materials is effected at elevated reaction temperatures which should be at least as high as the initial decomposition temperature of the free radical generating catalyst, such as the peroxide compound, in order to liberate and form free radicals which promote the reaction. In selecting a particular reaction temperature for use in the process of the present invention, two considerations must be taken into account. First, sufficient energy by means of heat must be supplied to the reaction system so that the reactants, namely, the 1-halodecahydronaphthalene and the polyhalogenated hydrocarbon, will be activated sufficiently for hydrogen-halogen transfer to take place when free radicals are generated by the catalyst. Second, free radical generating catalysts such as peroxy compounds, particularly organic peroxides, decompose at a measurable rate with time in a logarithmic function dependent upon temperature. This rate of decomposition can be and ordinarily is expressed as the half life of a peroxide at a particular temperature. For example, the half life in hours for di-t-butyl peroxide is 17.5 hours at 125° C., 5.3 hours at 135° C. and 1.7 hours at 145° C. (calculated from data for the first 33% decomposition). A reaction system temperature must then be selected so that the free radical generating catalyst decomposes smoothly with the generation of free radicals at a half life which is not too long. In other words, sufficient free radicals must be present to induce the present chain reaction to take place, and these radicals must be formed at a temperature at which the reactants are in a suitably activated state for condensation. When the half life of the free radical generating catalyst is greater than 10 hours, radicals are not generated at a sufficient rate to cause the reaction to go forward at a detectable rate. Thus, the reaction temperature may be within the range of from about 50° to about 300° C. and at least as high as the decomposition temperature of the catalyst, by which is meant a temperature such that the half life of the free radical generating catalyst is not greater than 10 hours. Since the half life for each free radical generating catalyst is different at different temperatures, the exact temperature to be utilized in a particular reaction will vary. However, persons skilled in the art are well acquainted with the half life vs. temperature data for different free radical generating catalysts and thus it is within the skill of one familiar with the art to select the particular temperature needed for any particular catalyst. However, the operating temperatures generally do not exceed the decomposition temperature of the catalyst by more than about 150° C. For example, when a free radical generating catalyst such as t-butyl perbenzoate is used having a decomposition temperature of approximately 115° C., the operating temperature of the process is from about 115° to about 265° C. When di-t-butyl peroxide having a decomposition temperature of about 130° C. is used, the process is run at a temperature ranging from about 130° to about 280° C. Higher reaction temperatures may be employed, but little advantage is gained if the temperature is more than the hereinbefore mentioned 150° C. higher than the decomposition temperature of the catalyst. In addition to the elevated temperatures which are utilized, the reaction may also be effected at elevated pressures ranging from about 1 to about 100 atmospheres or more, the preferred operating pressure of the process being that which is required to maintain a substantial portion of the reactants in liquid phase. Pressure is not an important variable in the process of this invention. However, because of the low boiling points of some of the reactants, it is necessary to utilize pressure withstanding equipment to insure liquid phase conditions. In batch type operations it is often desirable to utilize pressure withstanding equipment, to charge the reactants and catalyst to the vessel, and to pressure the vessel with 10, 30, 50 or more atmospheres with an inert gas such as nitrogen. This helps to insure the presence of liquid phase conditions. However, when the mole quantity of reactants is sufficient, the pressure which they themselves generate at the temperature utilized is sufficient to maintain the desired phase conditions. Furthermore, the concentration of the catalyst employed in this process may vary over a rather wide range but it is desirable to utilize low concentrations of catalysts such as from about 0.1 to about 10% of the total weight of the combined starting materials charged to the process. The reaction time may be within the range of from less than one minute to several hours depending upon the temperature and half life of the free radical generating catalyst. Generally speaking, contact times of at least 10 minutes are preferred.

The process of the present invention may be effected in any suitable manner and may comprise either a batch or continuous type operation. For example, when a batch type operation is used, a quantity of the pure trans-decahydronaphthalene which has been obtained by the conventional means hereinbefore set forth is placed in an appropriate apparatus such as, for example, a rotating autoclave along with a catalytic amount of the organic peroxy compound. The polyhalogenated hydrocarbon is then added thereto in either gaseous or liquid form depending upon the particular hydrocarbon utilized. In the event that temperatures higher than those normally used are to be employed, the desired pressure which is required to maintain a major portion of the reactants in liquid form is effected by the introduction of an inert gas such as nitrogen and the apparatus is thereafter heated to the desired operating temperature which, as hereinbefore set forth, ranges from a temperature at least as high as the decomposition temperature of the catalyst up to a temperature approximately 150° C. higher than said decomposition temperature. Upon completion of the desired residence time, the apparatus and contents thereof are allowed to cool to room temperature. Any excess pressure is vented and the reaction product is separated from any remaining catalyst and/or undesired side reaction products and thereafter recovered by conventional means such as fractional distillation, crystallization, etc.

It is also contemplated within the scope of this invention that the process of the present invention may be effected by a continuous type operation. In this type of operation the starting materials comprising the pure trans-decahydronaphthalene and the halogenated hydrocarbon are continuously charged to a reaction zone which is maintained at the proper operating conditions of temperature and pressure, said reaction zone containing the organic peroxy catalyst. These starting materials may be charged to the reaction zone through separate lines or, if so desired, may be admixed before entry into said reactor and charged thereto in a single line. In addition, if so desired, the organic peroxy catalyst may also be continuously charged to the reaction zone through a separate line in a catalytic amount per amount of starting materials. After a desired residence time has elapsed, the reaction product is continuously withdrawn, separated from the reactor effluent and purified by conventional means hereinbefore set forth while the unreacted starting materials may be recycled to form a portion of the feed stock.

The following examples are given to illustrate the process of the present invention which, however, are not intended to limit the generally broad scope of the present invention in strict accordance therewith.

*Example I*

In this example 276 grams (2.0 mole) of trans-decahydronaphthalene, 308 grams (2.0 mole) of carbon tetrachloride, 5 grams (0.02 mole) of benzoyl peroxide and 28 grams (0.2 mole) of potassium carbonate were placed in a flask provided with heating and refluxing means. The flask and contents thereof were then heated to reflux and maintained thereat for a period of about 20 hours. At the end of this time the flask and contents thereof were allowed to cool to room temperature. The solids were removed by filtration, the liquid was washed with water to remove any water soluble material which may have been present and thereafter dried over anhydrous sodium sulfate. Thereafter the liquid was subjected to fractional distillation under reduced pressure and the cut which boiled in a range of from 98° to 101° C. at 13 mm. pressure comprising 1 - chlorodecahydronaphthalene was separated and recovered.

*Example II*

A mixture of 276 grams (2.0 mole) of trans-decahydronaphthalene, 664 grams (2.0 mole) of carbon tetrabromide, 5 grams (0.02 mole) of benzoyl peroxide and 28 grams (0.2 mole) of potassium carbonate is placed in a flask provided with refluxing means. The flask is heated to a temperature of about 110° C. and maintained at a temperature in the range of from about 110° to about 120° C. for a period of about 20 hours. At the end of this time the solids are removed by filtration, the liquid portion or filtrate is washed with water to remove any water soluble material which may have come through and thereafter dried over anhydrous sodium sulfate. Upon distillation under reduced pressure the cut comprising 1-bromodecahydronaphthalene is separated and recovered.

*Example III*

A mixture of 276 grams (2.0 mole) of trans-decahydronaphthalene, 239 grams (2.0 mole) of chloroform, 3 grams (0.02 mole) of di-t-butyl peroxide and 28 grams (0.2 mole) of potassium carbonate is placed in a flask provided with heating and refluxing means. The flask is heated to a temperature of about 130° C. and maintained in a range of from about 130° to about 150° C. for a period of about 20 hours. At the end of this time the flask and contents thereof are allowed to cool to room temperature and the contents thereafter filtered to remove the solids present. The filtrate is washed with water and dried over anhydrous sodium sulfate. Following this, the filtrate is subjected to fractional distillation under reduced pressure and the desired cut comprising 1-chlorodecahydronaphthalene is separated and recovered.

*Example IV*

A mixture of 276 grams (2.0 mole of trans-decahydronaphthalene, 506 grams (2.0 mole) of bromoform, 3 grams (0.02 mole) of di-t-butylperoxide and 28 grams (0.2 mole) of potassium carbonate is treated in a manner similar to that set forth in Example III above. Upon completion of the desired residence time the solids are separated from the organic liquid layer by filtration following which the liquid layer is washed with water, dried over anhydrous sodium sulfate and subjected to fractional distillation under reduced pressure. The cut comprising 1 - bromodecahydronaphthalene is separated and recovered.

We claim as our invention:

1. A process for the production of a 1-halodecahydronaphthalene which comprises treating essentially pure trans-decahydronaphthalene with a polyhalogenated saturated hydrocarbon in the presence of an organic proxide catalyst at a temperature at least as high as the decomposition temperature of said catalyst, and recovering the resultant 1-halodecahydronaphthalene.

2. A process for the production of a 1-halodecahydronaphthalene which comprises treating essentially pure trans-decahydronaphthalene with a polyhalogenated saturated hydrocarbon in the presence of an organic peroxide catalyst at a temperature in the range of from about 50° to about 300° C., and recovering the resultant 1-halodecahydronaphthalene.

3. A process for the production of 1-chlorodecahydronaphthalene which comprises treating essentially pure trans-decahydronaphthalene with a polychlorinated saturated hydrocarbon in the presence of an organic peroxide catalyst at a temperature in the range of from about 50° to about 300° C., and recovering the resultant 1-chlorodecahydronaphthalene.

4. A process for the production of 1-bromodecahydronaphthalene which comprises treating essentially pure trans-decahydronaphthalene with a polybrominated saturated hydrocarbon in the presence of an organic peroxide catalyst at a temperature in the range of from about 50° to about 300° C., and recovering the resultant 1-bromodecahydronaphthalene.

5. A process as set forth in claim 2 characterized in that said catalyst is di-t-butyl peroxide.

6. A process as set forth in claim 2 characterized in that said catalyst is benzoyl peroxide.

7. A process for the production of 1-chlorodecahydronaphthalene which comprises treating essentially pure trans-decahydronaphthalene with carbon tetrachloride in the presence of an organic peroxide catalyst at a temperature in the range of from about 50° to about 300° C., and recovering the resultant 1-chlorodecahydronaphthalene.

8. A process for the production of 1-bromodecahydronaphthalene which comprises treating essentially pure trans-decahydronaphthalene with carbon tetrabromide in the presence of an organic peroxide catalyst at a temperature in the range of from about 50° to about 300° C., and recovering the resultant 1-bromodecahydronaphthalene.

9. A process for the production of 1-chlorodecahydronaphthalene which comprises treating essentially pure trans-decahydronaphthalene with chloroform in the presence of an organic peroxide catalyst at a temperature in the range of from about 50° to about 300° C., and recovering the resultant 1 - chlorodecahydronaphthalene.

10. A process for the production of 1-bromodecahydronaphthalene which comprises treating essentially pure trans-decahydronaphthalene with bromoform in the presence of an organic peroxide catalyst at a temperature in the range of from about 50° to about 300° C., and recovering the resultant 1-bromodecahydronaphthalene.

11. A process for the production of 1-chlorodecahydronaphthalene which comprises treating essentially pure trans-decahydronaphthalene with carbon tetrachloride in the presence of benzoyl peroxide at a temperature in the range of from about 80° to about 120° C., and recovering the resultant 1-chlorodecahydronaphthalene.

12. A process for the production of 1-bromodecahydronaphthalene which comprises treating essentially pure trans-decahydronaphthalene with carbon tetrabromide in the presence of benzoyl peroxide at a temperature in the range of from about 80° to about 120° C., and recovering the resultant 1-bromodecahydronaphthalene.

13. A process for the production of 1-chlorodecahydronaphthalene which comprises treating essentially pure trans-decahydronaphthalene with chloroform in the presence of di-t-butyl peroxide at a temperature in the range of from about 130° to about 150° C., and recovering the resultant 1-chlorodecahydronaphthalene.

14. A process for the production of 1-bromodecahydronaphthalene which comprises treating essentially pure trans-decahydronaphthalene with bromoform in the presence of di-t-butyl peroxide at a temperature in the range of from about 130° to about 150° C., and recovering the resultant 1-bromodecahydronaphthalene.

References Cited by the Examiner
UNITED STATES PATENTS

| | | | |
|---|---|---|---|
| 2,553,799 | 5/1951 | West et al. | 260—648 |
| 2,629,748 | 2/1953 | Condon | 260—648 |

OTHER REFERENCES

Bartlett et al.: "J. Am. Chem. Soc.," vol. 66, pp. 1531 to 9 (1944).

LEON ZITVER, *Primary Examiner.*

M. JACOB, *Assistant Examiner.*